(12) United States Patent
LiPiShan et al.

(10) Patent No.: US 10,160,841 B2
(45) Date of Patent: *Dec. 25, 2018

(54) ETHYLENE/ALPHA-OLEFIN/NONCONJUGATED POLYENE BASED COMPOSITIONS AND FOAMS FORMED FROM THE SAME

(71) Applicant: Dow Global Technologies LLC, Midland, MI (US)

(72) Inventors: Colin LiPiShan, Pearland, TX (US); Timothy E. Clayfield, Waedenswil (CH); Sonja M. Delatte, Denham Springs, LA (US)

(73) Assignee: Dow Global Technologies LLC, Midland, MI (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/434,055

(22) PCT Filed: Mar. 15, 2013

(86) PCT No.: PCT/US2013/032468
§ 371 (c)(1),
(2) Date: Apr. 7, 2015

(87) PCT Pub. No.: WO2014/084892
PCT Pub. Date: Jun. 5, 2014

(65) Prior Publication Data
US 2015/0259491 A1    Sep. 17, 2015

Related U.S. Application Data

(60) Provisional application No. 61/731,869, filed on Nov. 30, 2012.

(51) Int. Cl.
C08F 210/18    (2006.01)
C08J 9/00    (2006.01)

(52) U.S. Cl.
CPC ............... C08J 9/00 (2013.01); C08F 210/18 (2013.01); C08J 2323/16 (2013.01); Y10T 428/139 (2015.01)

(58) Field of Classification Search
CPC . C08F 210/18; C08L 23/16; C08J 9/00; C08J 2323/16
See application file for complete search history.

(56) References Cited

U.S. PATENT DOCUMENTS

| 4,722,971 | A | 2/1988 | Datta et al. |
| 5,610,254 | A | 3/1997 | Sagane et al. |
| 5,691,413 | A | 11/1997 | Morikawa et al. |
| 6,384,290 | B1 | 5/2002 | Koshiba |
| 2005/0124753 | A1 | 6/2005 | Ashihara et al. |
| 2009/0209672 | A1 | 8/2009 | Ebata et al. |
| 2011/0160323 | A1 | 6/2011 | Liang et al. |
| 2011/0233448 | A1 | 9/2011 | Ebata et al. |
| 2015/0210838 | A1 | 7/2015 | Wu et al. |
| 2015/0274867 | A1 | 10/2015 | LiPiShan et al. |

FOREIGN PATENT DOCUMENTS

| JP | 200630710 | 11/2006 | |
| JP | 200633584 | 12/2006 | |
| JP | 200719149 | 8/2007 | |
| WO | 2009/072503 A1 | 6/2009 | |
| WO | WO 2011008837 A1 * | 1/2011 | ............ C08F 297/06 |
| WO | 2012027448 A1 | 3/2012 | |
| WO | WO-2012092491 A2 * | 7/2012 | .............. C08L 23/16 |

OTHER PUBLICATIONS

EPDM for Automotive Sponge—D.W. Tredinnick Crompton/Uniroyal—Rubber World, May 2003.
G. Stella and N.P. Cleremisinoff "Design technology advancements for EPDM sponge seals." presented at the International Rubber Conference, June.
Noordermeer, Cellular polymers, 1997, vol. 16, p. 331.
http://www.exxonmobilchemical.com/Chem-English/yourindustry/automotive-weatherseals-primary-door-seals.aspx.
PCT/US2013/032468, dated Jul. 23, 2013, International Search Report and Written Opinion.
PCT/ US2013/032468, dated Jun. 2, 2015, International Preliminary Report on Patentability.

* cited by examiner

*Primary Examiner* — Kara B Boyle
(74) *Attorney, Agent, or Firm* — Husch Blackwell LLP (57) ABSTRACT

The invention provides a composition comprising a first composition that comprises an ethylene/alpha-olefin/non-conjugated polyene interpolymer that has the following properties: A) a Mw greater than, or equal to, 150,000 g/mole; and B) a peak area from 21.3 ppm to 21.8 ppm that is greater than, or equal to, 3.0 percent of the total integral area from 19.5 ppm to 22.0 ppm, as determined by 13C NMR; and wherein the first composition has a tan delta (190 C at 0.1 rad/sec) less than, or equal to, 1.0.

14 Claims, 2 Drawing Sheets

ETHYLENE/ALPHA-OLEFIN/NONCONJUGATED POLYENE BASED COMPOSITIONS AND FOAMS FORMED FROM THE SAME

REFERENCE TO RELATED APPLICATIONS

This application claims the benefit of U.S. Provisional Application No. 61/731,869, filed on Nov. 30, 2012.

BACKGROUND OF THE INVENTION

There is a need for polymer compositions that have improved foaming characteristics (high expansion and smooth surface quality) and reduced water absorption for the targeted foam density. The observed water absorption relates directly to the foamed structure and number of closed cells present in the foam. The foaming process is a delicate balance of the cross-linking of the EPDM and expansion (from a foaming agent, such as CELOGEN OT), which depends highly on the melt elasticity of the EPDM, as well as on the viscosity increase during the expansion and cure cycle. The melt elasticity of the polymer is related to its molecular weight and degree of long-chain branching present. Typical sponge EPDM products, such as VISTALON 8800 (Exxon-Mobil) and KELTAN 7341A (Lanxess), are oil-extended products that are high in molecular weight, and are relatively amorphous. When formulated and vulcanized into a foamed article, these EPDM resins are generally considered the 'best-in-class' in terms of water absorption, and foamed properties, such as compression set and tensile. Rubber compositions for foams and/or other applications are also disclosed in the following: US20110233448A1, US6384290B1, US5691413B1, US20090209672, U.S. Pat. No. 4,722,971A, U.S. Pat. No. 5,610,254, US20110160323, WO2009/072503 (abstract), JP2006307100A (abstract), JP2007191497A (abstract), and JP2006335847A (abstract).

However, there is a need for new polymer compositions that have improved foaming characteristics (high expansion and smooth surface quality) and reduced water absorption for the targeted foam density. These needs have been met by the following invention.

SUMMARY OF THE INVENTION

The invention provides a composition comprising a first composition that comprises an ethylene/alpha-olefin/nonconjugated polyene interpolymer that has the following properties:

A) a Mw greater than, or equal to, 150,000 g/mole, as determined by conventional GPC; and B) a peak area from 21.3 ppm to 21.8 ppm that is greater than, or equal to, 3.0 percent of the total integral area from 19.5 ppm to 22.0 ppm, as determined by 13C NMR; and wherein the first composition has a tan delta (190° C. at 0.1 rad/sec) less than, or equal to, 1.0.

DETAILED DESCRIPTION OF THE INVENTION

As discussed above, the invention provides a composition comprising a first composition that comprises an ethylene/alpha-olefin/nonconjugated polyene interpolymer that has the following properties:

A) a Mw greater than, or equal to, 150,000 g/mole; and

B) a peak area from 21.3 ppm to 21.8 ppm that is greater than, or equal to, 3.0 percent of the total integral area from 19.5 ppm to 22.0 ppm, as determined by 13C NMR; and wherein the first composition has a tan delta (190° C. at 0.1 rad/sec) less than, or equal to, 1.0.

The composition may comprise a combination of two or more embodiments described herein.

The first composition may comprise a combination of two or more embodiments described herein.

The ethylene/alpha-olefin/nonconjugated polyene interpolymer may comprise a combination of two or more embodiments described herein.

In one embodiment, the ethylene/α-olefin/nonconjugated polyene interpolymer is an ethylene/α-olefin/diene interpolymer (EAODM). In a further embodiment, the interpolymer is an ethylene/propylene/diene terpolymer (EPDM). In a further embodiment, the diene is 5-ethylidene-2-norobornene (ENB).

In one embodiment, the ethylene/alpha-olefin/nonconjugated polyene interpolymer has a Mw greater than, or equal to, 180,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/alpha-olefin/nonconjugated polyene interpolymer has a Mw greater than, or equal to, 200,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/alpha-olefin/nonconjugated polyene interpolymer that has a peak area from 21.3 ppm to 21.8 ppm that is greater than 5 percent, further greater than 10 percent, further greater than 15 percent of the total integral area from 19.5 ppm to 22.0 ppm, as determined by 13C NMR. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/alpha-olefin/nonconjugated polyene interpolymer that has a peak area from 21.3 ppm to 21.8 ppm that is greater than 16 percent, further greater than, or equal to, 17 percent, further greater than, or equal to, 18 percent of the total integral area from 19.5 ppm to 22.0 ppm, as determined by 13C NMR. In a further embodiment, the interpolymer is an EAODM, and further an ethylene/propylene/diene (EPDM) terpolymer. In a further embodiment, the diene is 5-ethylidene-2-norbornene (ENB).

In one embodiment, the first composition has a tan delta (190° C. at 0.1 sec$^-$) less than 1.0, further less than, or equal to, 0.9. In a further embodiment, the interpolymer is an EAODM, and further an ethylene/propylene/diene (EPDM) terpolymer. In a further embodiment, the diene is 5-ethylidene-2-norbornene (ENB).

In one embodiment, the first composition further comprises an oil. In a further embodiment, the interpolymer is an EAODM, and further an ethylene/propylene/diene (EPDM) terpolymer. In a further embodiment, the diene is 5-ethylidene-2-norbornene (ENB).

In one embodiment, the first composition has a viscosity at 0.1 rad/sec, 190° C., from 150,000 to 250,000 Pa·s. In a further embodiment, the interpolymer is an EAODM, and further an ethylene/propylene/diene (EPDM) terpolymer. In a further embodiment, the diene is 5-ethylidene-2-norbornene (ENB).

In one embodiment, the first composition comprises greater than, or equal to, 90 weight percent, further greater than, or equal to, 95 weight percent, further greater than, or equal to, 98 weight percent, of the ethylene/alpha-olefin/nonconjugated polyene interpolymer, based on the weight of the first composition.

The first composition may comprise a combination of two or more embodiments described herein.

In one embodiment, the ethylene/α-olefin/nonconjugated polyene interpolymer has a rheology ratio (V0.1/V100 at 190° C.) greater than, or equal to, 40, further greater than, or equal to, 50, and further greater than, or equal to, 60. In a further embodiment, the interpolymer is an EAODM, and further an ethylene/propylene/diene (EPDM) terpolymer. In a further embodiment, the diene is 5-ethylidene-2-norbornene (ENB). The rheology ratio (V0.1/V100 at 190° C.) is that of the neat polymer (no oil, no filler); polymer is typically stabilized with "ppm amounts" of one or more antioxidants and/or other stabilizers.

In one embodiment, the ethylene/α-olefin/nonconjugated polyene interpolymer has a rheology ratio (V0.1/V100 at 190° C.) greater than, or equal to, 70, further greater than, or equal to, 80, and further greater than, or equal to, 90. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a rheology ratio (V0.1/V100 at 190° C.) from 80 to 130. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 6 to 15 weight percent polyene, further from 6 to 10 weight percent polyene, and further from 7 to 10 weight percent polyene, based on the weight of the interpolymer. In a further embodiment, the polyene is a diene. In a further embodiment, the diene is 5-ethylidene-2-norbornene (ENB).

In one embodiment, the ethylene/α-olefin/nonconjugated polyene interpolymer has a Mooney Viscosity greater than, or equal to, 60, further greater than, or equal to, 80 (ML 1+4, 125° C.). Mooney viscosity is that of the neat polymer (no oil, no filler); polymer is typically stabilized with one or more antioxidants and/or other stabilizers. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a MWD less than, or equal to, 4.0, further less than, or equal to, 3.6. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) less than, or equal to, 500,000 g/mole, further less than, or equal to, 400,000 g/mole, further less than, or equal to, 300,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) from 150,000 to 500,000 g/mole, further from 180,000 to 400,000 g/mole, further from 200,000 to 300,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 40 to 65 weight percent ethylene, further from 40 to 60 weight percent ethylene, and further from 45 to 58 weight percent ethylene, based on the weight of the interpolymer. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer is present in an amount greater than 20 weight percent, further greater than, or equal to 30 weight percent, and further greater than, or equal to 40 weight percent, based on the weight of the composition. In a further embodiment, the interpolymer is an EAODM, further an ethylene/propylene/diene (EPDM) terpolymer. In a further embodiment, the diene is 5-ethylidene-2-norbornene (ENB).

The ethylene/α-olefin/nonconjugated polyene interpolymer, further an EAODM, and further an EPDM, may comprise a combination of two or more embodiments as described herein.

In one embodiment, an inventive composition further comprises a filler. Suitable fillers include, but are not limited to, clay, CaCO3, talc, and mineral fibers.

In one embodiment, the filler is present in an amount from 5 to 30 weight percent, based on the weight of the composition.

In one embodiment, an inventive composition further comprises at least one stabilizer. Suitable fillers include, but are not limited to, AO and UV stabilizers.

The inventive composition may comprise a combination of two or more embodiments described herein.

The invention also provides an article comprising at least one component formed from an inventive composition of any embodiment described herein.

In one embodiment, the article is a foam.

In one embodiment, the article is selected from the group consisting of profiles, injection molded parts, gaskets, automotive parts, building and construction materials, shoe components and tubes.

An inventive article may comprise a combination of two or more embodiments as described herein.

The invention also provides a process for preparing the composition of any embodiment described herein, said process comprising polymerizing, in solution, at least the following: ethylene, an alpha-olefin and a nonconjugated polyene. In a further embodiment, the ethylene, an alpha-olefin and a nonconjugated polyene are polymerized in a continuous solution polymerization process.

An inventive process may comprise a combination of two or more embodiments as described herein.

Ethylene/α-Olefin/Nonconjugated Polyenes Interpolymer

The ethylene/α-olefin/non-conjugated polyene interpolymer for the inventive compositions described herein, comprises, in polymerized form, ethylene, an α-olefin, and a non-conjugated polyene. Suitable examples of α-olefins include the C3-C20 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/-diene (EPDM) terpolymer. In a further embodiment, the diene is 5-ethylidene-2-norbornene (ENB).

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-deca-diene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/nonconjugated polyene interpolymer comprises a majority amount of polymerized ethylene, based on the weight of the interpolymer. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a molecular weight distribution (Mw/Mn) from 1.7 to 5.0, or from 2.0 to 4.0, or from 2.1 to 3.5, or from 2.5 to 3.5. In a further embodiment, the ethylene/α-olefin/nonconjugated polyene interpolymer is an ethylene/α-olefin/diene interpolymer (EAODM). In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., greater than, or equal to, 60, or greater than, or equal to, 70, or greater than, or equal to 80, or greater than, or equal to 90. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., less than 500, or less than, or equal to, 300, or less than, or equal to, 200. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., from 60 to 500, or from 70 to 300, or from 80 to 200. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

Mooney viscosity is that of the neat interpolymer (or -calculated viscosity of neat polymer for polymers that contain a filler, such as carbon black, and/or an oil). The neat polymer refers to the polymer without filler and without oil.

In one embodiment, the ethylene/α-olefin/nonconjugated polyene interpolymer is a colorable interpolymer. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

An ethylene/α-olefin/nonconjugated polyene interpolymer may comprise a combination of two or more embodiments as described herein.

An ethylene/alpha-olefin/diene interpolymer may comprise a combination of two or more embodiments as described herein.

An EPDM terpolymer may comprise a combination of two or more embodiments as described herein.

Oils

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

In one embodiment, the oil is present in an amount from 5 to 70 weight percent, further from 5 to 50 weight percent, based on the weight of the composition.

In one embodiment, the oil is selected from the group consisting of nonaromatic oils, paraffinic oils, naphthenic oils, and combinations thereof. Suitable oils include, but are not limited to, PARALUX 6001, HYDROBRITE 550, and CALSOL 5550.

An oil may comprise a combination of two or more embodiments as described herein.

Additives

An inventive composition may comprise one or more additional additives. Suitable additives include, but are not limited to, fillers, antioxidants, UV stabilizers, flame retardants, colorants or pigments, and combinations thereof.

Fillers include, but are not limited to, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like.

Some antioxidants and antiozonants include, but are not limited to, hindered phenols, bisphenols, and thiobisphenols; and substituted hydroquinones. Foaming agents, such as azodicarbonamide, can be used for making a foam structure.

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

The inventive compositions are especially suitable for use as foams for automotive sealants. For example, an inventive composition can be used for a door sealant, for example, a primary door sealant, to insulate the cabin from air and water entry. A primary door sealant must have good surface quality, high collapse resistance, good tensile strength, low foam density, and low water absorption.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts or impurities, such as catalyst residues, can be incorporated within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term "ethylene/α-olefin/diene terpolymer," as used herein, refers to a polymer that comprises, in polymerized form, ethylene, an α-olefin, and a diene, as the only monomer types. In one embodiment, the "ethylene/α-olefin/diene terpolymer" comprises a majority weight percent of ethylene (based on the weight of the terpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The term "incorporated oil," as used herein, refers to oil contained within an ethylene/α-olefin/nonconjugated polyene interpolymer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Mooney Viscosity

Interpolymer [ethylene/α-olefin/nonconjugated polyene interpolymer (e.g., EPDM with no filler and no oil) or ethylene/α-olefin/nonconjugated polyene interpolymer (e.g., EPDM) with oil-extender] Mooney Viscosity (ML1+4 at 125° C.) was measured in accordance with ASTM 1646-04, using the large rotor, with a one minute preheat time and a four minute rotor operation time. The instrument was an Alpha Technologies Mooney Viscometer 2000.

Mooney Viscosity (no filler, no oil) versus Mw (weight avg. MW) can be estimated by the following equation: MV(ML 1+4 at 125° C.)=147.82 ln(Mw)−1697.3.

Oil-Extended Mooney Viscosity (OE MV) versus Mooney Viscosity (no filler, no oil) can be estimated by the following equation:

OE MV(ML 1+4 at 125° C.)={[MV(ML 1+4 at 125° C.)]×[100/(100+phr oil)]$^{2.8}$}.

Conventional Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron, Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene}=A\times(M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

FTIR Method for EPDM Composition Analysis

The terpolymers containing ethylene, propylene, and 5-ethylidene-2-norbornene were analyzed using ASTM D3900 for its ethylene content, and ASTM D6047 for its ethylidene-norbornene or dicyclopentadiene content.

C13 NMR Method for EPDM Composition Analysis

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of the composition of the examples was carried out using the following analysis method. Quantitation of monomers present in EPDM can be calculated using the following equations (1 through 9).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2}, \quad \text{Equation 1}$$

$$molesENB = CH3(13.6 - 14.7 ppm), \quad \text{Equation 2}$$

$$molesP = CH3(19.5 - 22.0 ppm), \quad \text{Equation 3}$$

$$mole\%ethylene = \frac{100*molesE}{molesE + molesP + molesENB}, \quad \text{Equation 4}$$

$$mole\%propylene = \frac{100*molesP}{molesE + molesP + molesENB}, \quad \text{Equation 5}$$

$$mole\%ENB = \frac{100*molesENB}{molesE + molesP + molesENB}, \quad \text{Equation 6}$$

$$Wt\%ethylene = \frac{100*mole\%E*28}{mole\%E*28 + mole\%P*42 + mole\%ENB*120}, \quad \text{Equation 7}$$

$$Wt\%propylene = \frac{100*mole\%P*42}{mole\%E*28 + mole\%P*42 + mole\%ENB*120}, \text{ and} \quad \text{Equation 8}$$

$$Wt\%ENB = \frac{100*mole\%ENB*120}{mole\%E*28 + mole\%P*42 + mole\%ENB*120}. \quad \text{Equation 9}$$

Further NMR spectral analysis of the EPDMs used in the inventive compositions, displays a peak area from 21.3-21.8 ppm greater than 3.0% of the total integral area from 19.5 to 22.0 ppm. Similar spectral analysis of the EPDMs (except NORDEL IP 5565) used in the comparative compositions, show less than 3.0% of the total integral area from 19.5 to 22.0 ppm. Spectral data are referenced to the EEE backbone at 30 ppm. Peak responses in this region typically are related to differences in propylene tacticity (% mm) that have been incorporated into the EPDM. A similar analysis can be done for another type of ethylene/α-olefin/non-conjugated polyene interpolymer.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range from 0.1 to 100 rad/s. The strain amplitude was adjusted, based upon the response of the samples, from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platents (15-20° C.) for two minutes. The rheology ratio of the viscosity at 0.1 rad/sec to the viscosity at 100 rad/sec (V0.1/V100 at 190° C.; also referred to as "RR") was recorded. A linear molecule (no detectable long chain branching) typically has a RR of 8 or less. It is acknowledged that the presence oil in the polymer can decrease the observed RR, so the following equation was used to estimate the RR of a polymer ($RR_{polymer}$) from the RR value of a polymer containing oil ($RR_{oE\_Polymer}$): $RR_{Polymer}=RR_{oE\_Polymer}/(\text{wt }\% \text{ oil}*(-0.01988)+1.0321)$.

Differential Scanning Calorimetry (DSC)

Differential Scanning calorimetry (DSC) was used to measure crystallinity in ethylene-based (PE) samples (including EPDM). Polymer (0.5 g) sample was compression molded into a film, at 5000 psi, 190° C., for two minutes. About 5 to 8 mg of film sample was weighed and placed in a DSC pan. The lid was crimped on the pan to ensure a closed atmosphere. The sample pan was placed in a DSC cell, and then heated, at a rate of approximately 10° C./min, to a temperature of 180° C. for PE. The sample was kept at this temperature for three minutes. Then the sample was cooled at a rate of 10° C./min to −90° C. for PE, and kept isothermally at that temperature for three minutes. The sample was next heated at a rate of 10° C./min, until complete melting (second heat). The percent crystallinity was calculated by dividing the heat of fusion ($H_f$), determined from the second heat curve, by a theoretical heat of fusion of 292 J/g for PE, and multiplying this quantity by 100 (for example, % cryst.=($H_f$/292 J/g)×100 (for PE)).

Unless otherwise stated, melting point(s) ($T_m$) of each polymer was determined from the second heat curve, and the crystallization temperature ($T_c$) was determined from the first cooling curve.

Compression Set

Compression set was measured according to ASTM D395 at 23° C. and 100° C. Disks of "29 mm (±0.5 mm)" in diameter and "12.7 (±0.5 mm)" thickness were punched from compression molded plaques, prepared as described under the section of compression molding (see Experimental section). Each button sample was inspected for notches, uneven thickness and inhomogeneity, and selected buttons (without those defects) were tested. Compression set was performed on two specimens for each sample, at the temperatures specified, and the average of the two specimens reported. The button sample was placed in the compressive device having two metal plates, which could be pressed together, and locked into place at 75% of the original height of the button sample. The compressive device, with the compressed samples, was then placed in an oven, and equilibrated at the appropriate temperature for a specified time (22 hrs for 23° C. or 100° C.). In this test, the stress was released at the test temperature, and the thickness of the sample was measured after 30 minute equilibration period at room temperature. Compression set is a measured of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Tensile Stress—Strain Properties

Tensile properties were measured using specimens which were die cut using a small dog bone shaped micro tensile die, having the dimensions described in ASTM D-1708. The die cut specimens were cut from the compression molded plaques, which were prepared as described under the compression molding section (see the Experimental section). Tensile properties (tensile strength and elongation) were measured, at room temperature, following the method ASTM D-412, in the machine direction of an INSTRON MODEL 1122, made by INSTRU-MET.

Shore A Hardness

Sample specimens were cut from compression molded plaques which were prepared as described in the compression molding section (see Experimental section). Shore A hardness was measured per ASTM D2240, on a Shore A Durometer Model 2000 made by INSTRON, with a Durometer Stand Model 902. This method permits hardness measurements based on either initial indentation or indentation after a specific period of time, or both. As used herein, the indentation was measured at a specified time of ten seconds.

Specific Gravity

The specific gravity of the foamed samples was measured in accordance to ASTM-D792.

Water Absorption by Vacuum Method

The determination of the water absorption was measured in accordance to ASTM D1056. This test method determines the water absorption properties of closed cell foam by measuring the change in weight (mass) after a specified immersion period. This test method is indirectly a measure of the sample's cell structure/closed cell content.

Cured foam samples were conditioned room for at least 1 day. The thermometer inside a vacuum oven cavity was maintained at reading room prior to testing. Cured foam samples were cut into 1" rods or 1" strips. Three sets of 1" sections were cut per sample. Each sample was weighed to 3 decimal places, and its Initial Weight recorded. A plastic container containing deionized water was used to submerge the samples. A plastic mesh was placed over the mouth of the plastic container, and the samples were down onto the mesh, until the plastic mesh touched the bottom of the container. The samples were at least 2" below the surface of the water. The sample container was placed in the vacuum oven (VWR Oven Model 1410), and a vacuum was applied, and reduce to 25 in Hg. The timing for the test was begun as soon as the "25 in/Hg" vacuum was reached. The vacuum pump was turned off after three minutes. The oven cavity was returned to atmospheric pressure by turning the pump off and venting the oven chamber to the atmosphere. The container remained in the oven for another three minutes, before the samples were removed from the plastic container. Excess surface water was removed from each sample before weighing the tested samples. Each tested sample was weighed as quickly as possible to avoid water loss by evaporation, and its Final Weight was recorded. The percent change in mass was calculated as follows:

$$W = \left[\frac{(A-B)}{B} \times 100\right],$$

where W=change in mass, %; A=final mass of specimen in air, g; and B=initial mass of specimen in air, g.

Experimental

I. Representative Synthesis of Experimental EPDM

Continuous Polymerization

The inventive polymers were produced using continuous solution polymerizations are carried out in a computer controlled autoclave reactor equipped with an internal stirrer. Purified mixed alkanes solvent (ISOPAR E available from ExxonMobil Chemical Company), ethylene, propylene, 5-ethylidene-2-norbornene, and hydrogen (where used) were supplied to a 3.8 L reactor, equipped with a jacket for temperature control and an internal thermocouple. The solvent feed to the reactor was measured by a mass-flow controller. A variable speed diaphragm pump controlled the solvent flow rate and pressure to the reactor. At the discharge of the pump, a side stream was taken to provide flush flows for the catalyst and cocatalyst injection lines, and the reactor agitator. These flows were measured by Micro-Motion mass flow meters, and controlled by control valves or by the manual adjustment of needle valves. The remaining solvent was combined with propylene, ethylene, 5-ethylidene-2-norbornene, and hydrogen (where used) and fed to the reactor. A mass flow controller was used to deliver hydrogen to the reactor as needed. See U.S. Pat. Nos. 5,977,251 and 6,545,088, and the references therein, for reactors and other conditions associated with continuous polymerizations.

The temperature of the solvent/monomer solution was controlled by use of a heat exchanger before entering the reactor. This stream entered the bottom of the reactor. The catalyst component solutions were metered using pumps and mass flow meters, and were combined with the catalyst flush solvent, and introduced into the bottom of the reactor. The reactor was run liquid-full at 500 psig (3.45 MPa), with vigorous stirring. Product was removed through exit lines at the top of the reactor. All exit lines from the reactor were steam traced and insulated. Polymerization was stopped by the addition of a small amount of water into the exit line, along with any stabilizers, or other additives, and passing the mixture through a static mixer. Also to reduce the process viscosity, extender oil (e.g., HYDROBRITE 550) was added in the specified amount. The product stream was then heated by passing through a heat exchanger before devolatilization. The polymer product was recovered by extrusion using a devolatilizing extruder and water cooled pelletizer. Process details and results are shown in Table 1A and 1B.

Catalyst 1 {[[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafniumdimethyl} was fed to the reactor separately, and activated in-situ using co-catalyst 1 and co-catalyst 2. Cocatalyst-1 was a mixture of methyldi($C_{14-18}$ alkyl)ammonium salts of tetrakis(pentafluorophenyl)borate, prepared by reaction of a long chain trialkylamine (ARMEEN M2HT, available from Akzo-Nobel, Inc.), HCl and Li[B($C_6F_5$)$_4$], substantially as disclosed in U.S. Pat. No. 5,919,988 (Ex. 2). Cocatalyst-1 was purchased from Boulder Scientific, and used without further purification. Cocatalyst-2 (modified methylalumoxane (MMAO)) was purchased from Akzo Nobel, and used without further purification.

The outlet stream of the reactor was consequently a mixture of polymer, solvent, and reduced levels of the initial monomer streams. The molecular weight of the polymer was controlled by adjusting reactor temperature, monomer conversion, and/or the addition of a chain terminating agent, such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase.

Tables 1A and 1B outline the reaction conditions used to produce some the inventive examples.

TABLE 1A

Reaction Conditions for Experimental EPDM

| Example | Reactor Volume, [gal] | Reactor Temp. [deg C.] | Pressure [psig] | Solvent Feed [lb/hr] | Ethylene Feed [lb/hr] | Propylene Feed [lb/hr] | ENB Feed [lb/hr] | Oil Feed [lb/hr] |
|---|---|---|---|---|---|---|---|---|
| EPDM01 | 1 | 160 | 524 | 39.03 | 2.52 | 4.10 | 0.74 | 0.00 |
| EPDM04 | 1 | 140 | 526 | 34.59 | 2.94 | 5.99 | 1.06 | 1.05 |
| EPDM07 | 1 | 130 | 523 | 30.45 | 1.99 | 3.10 | 0.78 | 1.14 |

TABLE 1B

Reaction Conditions for Experimental EPDM

| Example | H2 Mol % | C2 Concen. [g/L] | Catalyst Efficiency [lb_poly/lb_metal] *10E6 | Catalyst Flow [lb/hr] | Catalyst Solution Conc. (ppm) | Cocat-1 Flow [lb/hr] | Cocat-1 Solution Conc. (ppm) | Cocat-2 Flow [lb/hr] | Cocat-2 Solution Conc. [ppm] | Production Rate [lb/hr] |
|---|---|---|---|---|---|---|---|---|---|---|
| EPDM01 | 0.013 | 6.03 | 0.582 | 0.09 | 74.10 | 0.08 | 611.89 | 0.11 | 130.88 | 3.80 |
| EPDM04 | 0.009 | 14.5 | 0.586 | 0.08 | 74.10 | 0.08 | 611.89 | 0.11 | 130.88 | 3.60 |
| EPDM07 | 0.008 | 6.00 | 0.207 | 0.34 | 37.49 | 0.33 | 306.68 | 0.41 | 69.83 | 2.61 |

II. EPDM Polymer Compositions

Table 2 summarizes the properties of some of the comparative examples. Note that all of these examples, except for the NORDEL IP 5565, were produced in a process that uses a vanadium-based catalyst (such as VOC13 or VC14, low efficiency catalysts); ROYALENE EPDM, VISTALON EPDM and KELTAN EPDM are compositionally tailored products that may have been produced in single or dual reactor, and in the presence of additional branching agents (such as 1,4 hexadiene or 5-vinyl-2-norbornene).

Table 3 summarizes the properties of all the experimental EPDM's made for this study.

TABLE 2

Property Data for Comparative Examples (Commercial Resins)

| | | Units | Comp. NORDEL IP 5565 DOW | Comp. ROYALENE 525 Lion Copolymer | Comp. VISTALON 8600 ExxonMobil | Comp. VISTALON 8800 ExxonMobil | Comp. KELTAN 7341A Lanxess |
|---|---|---|---|---|---|---|---|
| First Composition | % C2 (FTIR) | | 49.2 | 60.7 | 56.7 | 56.4 | 59.4 |
| | % C3 (FTIR) | | 44.4 | 31.4 | 34.9 | 35.3 | 34.4 |
| | % ENB (FTIR) | | 6.43 | 7.87 | 8.43 | 8.28 | 6.19 |
| Incorporated Oil[a] | Oil | wt % | NA | NA | NA | 13.0 | 17.0 |
| Polymer MOONEY* | ML (1 + 4) 125° C. | MU | 63.3 | 64.0 | 92.8 | | |
| Polymer Mooney** | | | | | | 75.9 | 78.9 |
| Polymer Mooney without oil*** | | | | | | 127 | 131 |
| CONV. GPC | Mn | g/mol | 54,090 | 60,030 | 62,700 | 70,800 | 96,050 |
| | Mw | g/mol | 180,240 | 173,980 | 202,850 | 213,710 | 254,350 |
| | Mz | g/mol | 434,100 | 417,800 | 491,200 | 483,700 | 531,800 |
| | Mw/Mn | | 3.33 | 2.90 | 3.24 | 3.02 | 2.65 |
| Viscosity at 0.1 rad/s | V (0.1, 190° C.) | Pa-s | 78,612 | 136,390 | 283,810 | 195,710 | 243,890 |
| Viscosity at 100 rad/s | V (100, 190° C.) | Pa-s | 2,964 | 3,364 | 3,226 | 2,344 | 3,204 |
| Rheology Ratio* | RR V0.1/V100 | | 26.5 | 40.5 | 60.7 | | |
| Rheology Ratio** | | | | | | 33.5 | 76.1 |
| Rheology Ratio**** | | | | | | 43.3 | 109.6 |
| Tan Delta at 0.1 rad/s | TD (0.1, 190° C.) | | 1.55 | 0.94 | 0.67 | 0.66 | 0.67 |
| Tan Delta at 100 rad/s | TD (100, 190° C.) | | 0.58 | 0.58 | 0.49 | 0.49 | 0.45 |
| NMR % Peak Area 21.3-21.8 ppm | | % | 3.0 | 0.9 | 0.5 | 1.2 | 1.1 |

*Measured value without oil.
Measured value with oil. *Mooney (no oil) estimated using equation, OE MV(ML 1 + 4 at 125° C.) = {[MV(ML 1 + 4 at 125° C.)] × [100/(100 + phr oil)]$^{2.8}$} where OE MV is the Mooney of the polymer with oil and MV is the Mooney of the polymer without oil.
****Rheology ratio (no oil) estimated using equation, $RR_{Polymer} = RR_{OE\_Polymer}/(wt\% oil*(-0.01988) + 1.0321)$, where RRpolymer is the rheology ratio of polymer (no oil), and $RR_{OE}$ is the rheology ratio of the polymer with oil.
NA = Not Applicable
[a]Incorporated oil measured by mass balance, and equal to the weight percentage of oil added to the polymerized polymer, at the end of the polymerization process. Weight percentage based on total weight of polymer and oil.

TABLE 3

Properties of Experimental EPDM Samples

| | | Units | Comp. EPDM01 | Inventive EPDM04 | Inventive EPDM07 |
|---|---|---|---|---|---|
| First Composition | % C2 (13C NMR) | | 52.2 | 52.1 | 48.0 |
| | % ENB (13C NMR) | | 8.7 | 6.6 | 7.8 |
| Incorporated Oil[a] | Oil | wt % | | 22 | 22 |
| MOONEY* | ML (1 + 4) 125° C. | MU | 74.3 | | |
| MOONEY** | ML (1 + 4) 125° C. | MU | | 75.1 | 51.0 |
| Mooney without oil*** | | | | 150 | 100 |
| CONV. GPC | Mn | g/mol | 65,860 | 105,590 | 81,850 |
| | Mw | g/mol | 194,470 | 291,670 | 284,190 |
| | Mz | g/mol | 429,000 | 659,000 | 762,800 |
| | Mw/Mn | | 2.95 | 2.76 | 3.47 |
| Viscosity at 0.1 rad/s | V (0.1 190° C.) | Pa-s | 148,000 | 169,000 | 157,280 |
| Viscosity at 100 rad/s | V (100 190° C.) | Pa-s | 3,672 | 2,881 | 2,243 |
| Rheology Ratio* | RR (V0.1/V100) | | 40.3 | | |
| Rheology Ratio** | RR (with oil) | | | 58.7 | 70.1 |
| Rheology Ratio*** | RR (without oil) | | | 98.7 | 117.9 |
| Tan Delta at 0.1 rad/s | TD (0.1 190° C.) | | 1.1 | 0.9 | 0.77 |

TABLE 3-continued

Properties of Experimental EPDM Samples

|  | Units | Comp. EPDM01 | Inventive EPDM04 | Inventive EPDM07 |
|---|---|---|---|---|
| Tan Delta at 100 rad/s | TD (100 190° C.) | 0.50 | 0.41 | 0.43 |
| NMR % Peak Area 21.3-21.8 ppm |  | 16.4 | 17.9 | 23.2 |

*Measured value without oil.
Measured value with oil. *Mooney (no oil) estimated using equation, OE MV(ML 1 + 4 at 125° C.) = {[MV(ML 1 + 4 at 125° C.)] × [100/(100 + phr oil)]$^{2.8}$} where OE MV is the Mooney of the polymer with oil and MV is the Mooney of the polymer without oil.
****Rheology ratio (no oil) estimated using equation, $RR_{Polymer} = RR_{OE\_Polymer}/(wt\% oil*(-0.01988) + 1.0321)$, where RRpolymer is the rheology ratio of polymer (no oil), and $RR_{OE}$ is the rheology ratio of the polymer with oil.
$^a$Incorporated oil measured by mass balance, and equal to the weight percentage of oil added to the polymerized polymer, at the end of the polymerization process. Weight percentage based on total weight of polymer and oil.

Figure 1:
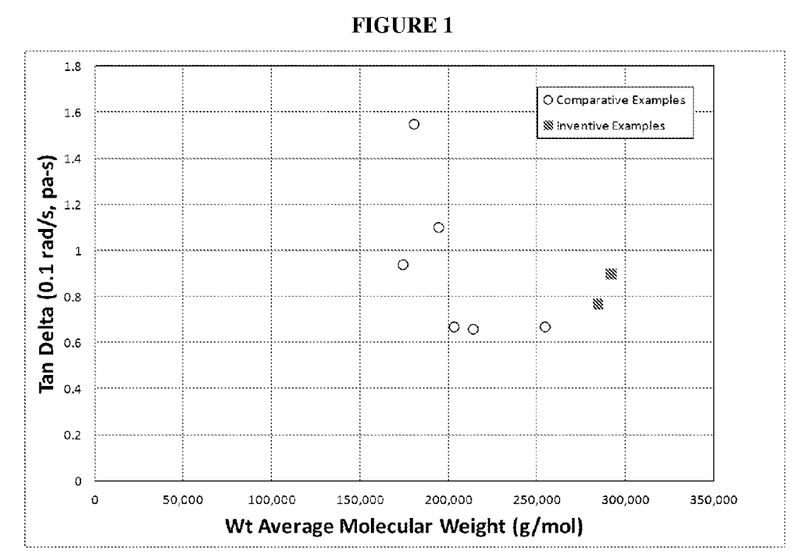
FIG. 1 depicts the Tan Delta 0.1 rad/sec, measured at 190° C.) versus the Weight Average Molecular Weight (Mw) for inventive and comparative polymers.

FIG. 1 shows the "Mw versus tan delta" for comparative and inventive (EPDM04 and EPDM07) compositions. As shown, the inventive compositions contain EPDMs that have weight average molecular weights greater than 200,000 g/mol, and these compositions show lower tan delta in a dynamic mechanical spectroscopy, frequency sweep at 190° C., indicating a higher degree of melt elasticity, imparted by a higher amount of long chain branching. High molecular weight and long chain branching are needed for high melt elasticity, which is important for sponge blowing to result in foamed article with low open-cell content.

Figure 2:
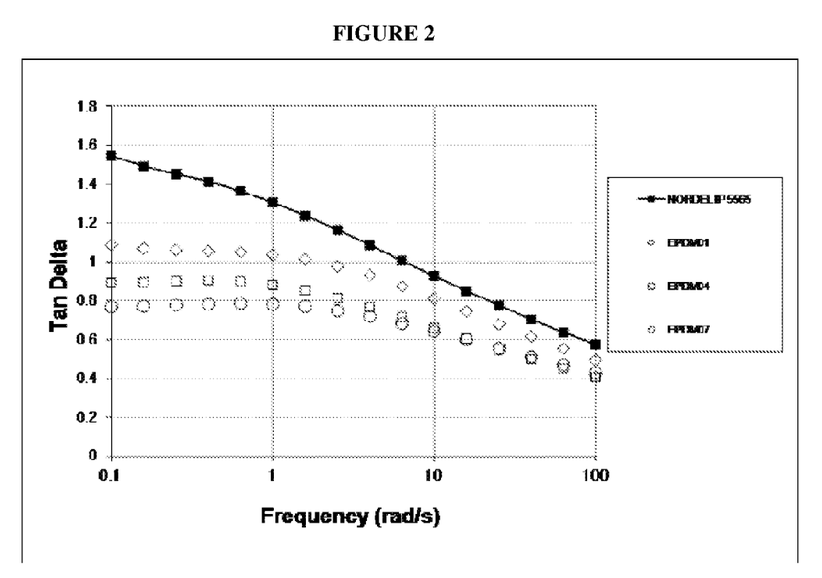
FIG. 2 depicts the Tan Delta versus Frequency (rad/s) profiles at 190° C. for inventive and comparative polymers.

FIG. 2 compares the tan delta response of the noted EPDM compositions. A range of tan delta response is shown with the EPDM04 and EPDM07, showing high melt elasticity (Tan Delta<1 at 0.1 rad/s), and EPDM01 showing a low melt elasticity (Tan Delta>1 at 0.1 rad/s). The inventive examples EPDM04 and EPDM07 show tan delta values less than one throughout the entire frequency range. The comparative example NORDEL IP 5565 has tan delta value greater than one, up to about 5 rad/s, and EPDM01 has tan delta values greater than one, up to about 2 rad/s. Comparing the "tan delta versus frequency" response of the inventive and comparative examples, leads to the observation that the inventive examples have high levels of branching and high molecular weight. Representation of the data (not shown) using a Van-Gurp Palmen plot (Phase Angle versus G*), further supports this observation (Trinkle, S.; Friedrich, C.; *Van Gurp-Palmen-plot: a way to characterize polydispersity of linear polymers*, Rheologica Act, 40, 322-328 (2001)).

Each inventive EPDM composition also contains an EPDM that has an unexpectedly high amount of propylene tacticity, as indicated by the "% NMR peak area between 21.3 and 21.8 ppm, at greater than 3.0%," as it relates to % mm (meso diads) tacticity in the EPDM. Table 2 shows that the commercially available EPDM material (such as ROYALENE 525, VISTALON 8600, 8800, or Lanxess (Keltan 7341A), made with Vanadium-based catalysts, do not exhibit this feature. This tacticity feature provides for a homogeneous melt, by improving the compatibility and dispersion of the EPDM with the other components. During the production of a foamed article, the improved compatibility provides an increase in the homogeneity of cell formation, with more uniform cell sizes produced throughout the foam.

III. Foams

The foam formulation used in this study is shown in Table 4. Specific foam formulations are shown in Table 5. Both the comparative and inventive examples are compounded with the recipes shown in Table 5. The comparative examples contained NORDEL IP 5565, VISTALON 8600, VISTALON 8800, and EPDM01. The inventive examples contained EPDM04 and EPDM 07. Note that the recipes for VISTALON 8800, EPDM04, and EPDM 07 were adjusted for the amounts of pre-incorporated oil that was present in the polymer.

TABLE 4

Formulations

| Sponge Formulation* Component | phr | wt % |
|---|---|---|
| First Composition | 100 | 35.5% |
| Carbon Black | 80 | 28.4% |
| Flexon ™ 845 | 65 | 23.1% |
| Calcium Carbonate | 25 | 8.9% |
| ZnO | 6 | 2.1% |
| Butyl Zimate | 1.5 | 0.5% |
| Sulphur | 1.5 | 0.5% |
| Stearic Acid | 1 | 0.4% |
| Methyl TUADS | 1 | 0.4% |
| Thiate | 0.5 | 0.2% |
| 20Total | 281.5 | 100.0% |

Ohm, R. F.; The Vanderbilt Rubber Handbook 13th Edition, Ed., R. F. Ohm, R. T. Vanderbilt Company, Inc., Norwalk, CT USA, 1990

TABLE 5

Formulations

| Example | Comp. | Comp. | Comp. | Comp. | Inventive | Inventive |
|---|---|---|---|---|---|---|
| Designation | F46-1 | F46-3 | F46-4 | F46-5 | F46-6 | F46-7 |
| First Composition | NORDEL IP 5565 | VISTALON 8600 | VISTALON 8800 | EPDM01 | EPDM04 | EPDM07 |
| Rubber | 100.0 | 100.0 | 115.0 | 100.0 | 128.0 | 128.0 |
| THERMAX N900 | 40.0 | 40.0 | 40.0 | 40.0 | 40.0 | 40.0 |
| FEF Black N550 | 40.0 | 40.0 | 40.0 | 40.0 | 40.0 | 40.0 |
| FLEXON 845 | 65.0 | 65.0 | 50.0 | 65.0 | 37.0 | 37.0 |
| Calcium Carbonate | 25.0 | 25.0 | 25.0 | 25.0 | 25.0 | 25.0 |

TABLE 5-continued

| | Formulations | | | | | |
|---|---|---|---|---|---|---|
| Example | Comp. | Comp. | Comp. | Comp. | Inventive | Inventive |
| ZnO | 6.0 | 6.0 | 6.0 | 6.0 | 6.0 | 6.0 |
| Butyl Zimate | 1.5 | 1.5 | 1.5 | 1.5 | 1.5 | 1.5 |
| Sulphur | 1.5 | 1.5 | 1.5 | 1.5 | 1.5 | 1.5 |
| Stearic Acid | 1.0 | 1.0 | 1.0 | 1.0 | 1.0 | 1.0 |
| Methyl TUADS | 1.0 | 1.0 | 1.0 | 1.0 | 1.0 | 1.0 |
| Thiate | 0.5 | 0.5 | 0.5 | 0.5 | 0.5 | 0.5 |
| Total | 282 | 282 | 282 | 282 | 282 | 282 |

*3 phr of CELOGEN OT blowing agent to be added during milling step.

Mixing of Rubber Compositions

Each foam formulation was shear mixed in a BANBURY mixer (starting from room temperature), and then milled into flat blankets using a roll-mill.

The formulation (without the blowing agent) was mixed using a Farrel BR Banbury Mixer (1.5 L volume) using an upside down mixing method. The polymer was weighed in, with the sulfur and other dry ingredients, and fluxed at a slow-speed for 2.5 minutes, at 66° C. (150° F.), the accelerator was added, and then the mixture was further fluxed, and then dropped at 99° C. (210° F.).

To prepare the foaming composition, the above composition, along with the blowing agent, was introduced into the Banbury, and fluxed for 2.5 minutes, and dropped at 93° C. (200° F.). A 6" Reliable Roll Mill was then used complete the mixing, and to mill an uncured blanket of the desired composition.

Compression Molded Plaques

The physical properties of the non-foamed compositions (do not contain the foaming agent) were measured from plaques, cured in a compression molder (for tensile, compression set testing). The samples were compression molded in accordance to ASTM D3182 using a PHI (100 ton press).

The desired mold (6"×6" plaque or compression buttons) was in platen. Each sample (uncured blanket) was cut slightly smaller than the dimensions of the individual mold cavity. The mill direction was marked, and the sample was labeled. Spray brush lightly with a dilute solution of silicone and apply to mold. Samples were placed in the preheated mold, taking care to place properly for mill direction. The platens were closed. The "normal" operating pressure was 100 tons, or as shown on the gauge as 200,000 pounds. When the cure time ended, the bottom platen was automatically open. The samples were removed, and immediately place in the water to stop curing. Samples were conditioned for 24 hours at room temperature, prior to testing. To vulcanize the samples, samples were conditioned at 200° C., using t95 data plus three minutes for plaques, and t95 data plus 15 minutes for compression set buttons.

Table 7 lists the Mooney, Shore A, tensile, and compression set properties from compression molded samples that did not contain the blowing agent. The Shore A of the cured compounds ranged from 22 to 27 ShA. The compression set, at 100° C., of the inventive examples were the lowest of all the examples; EPDM 04 had a value of 23%, and EPDM07 had a value of 26%. The compression set, at 100° C., of the comparative examples ranged from 28% to 39%.

MDR Analysis

MDR cure properties of each formulation were measured in accordance to ASTM D-3182, using an Alpha Technologies Rheometer MDR 2000. The MDR Test was carried out at 200° C., over a period of 12 minutes.

The rheology of the non-foamed formulations (do not contain the foaming agent) were measured from uncured blanket, cured in a rheometer (for MDR analysis), so that physical properties and cure properties could be tested. Samples were conditioned for 24 hours at room temperature, prior to testing. Table 6 shows the cure properties for each of the formulations. "T95 cure times (time for 95% cure)" are less than, or around, three minutes at 200° C. At 230° C., the cure time is expected to be well less than three minutes, so that the cross-linking is complete in the timeframe of the foaming experiment.

TABLE 6

| | Rheological Properties | | | | | | | |
|---|---|---|---|---|---|---|---|---|
| Example Type | | | Comp. | Comp. | Comp. | Comp. | Inventive | Inventive |
| Compounds MDR | | | F46-1 Norm | F46-3 | F46-4 | F46-5 | F46-6 | F46-7 |
| Test temp | [C.] | = | 200 | 200 | 200 | 200 | 200 | 200 |
| Test time | [min] | = | 12 | 12 | 12 | 12 | 12 | 12 |
| ML | [dNm] | : | 0.84 | 0.85 | 0.90 | 0.96 | 1.61 | 1.17 |
| MH | [dNm] | : | 11.9 | 11.32 | 11.4 | 11.89 | 13.38 | 11.44 |
| MH – ML | [dNm] | : | 11.06 | 10.47 | 10.5 | 10.93 | 11.77 | 10.27 |
| ts1 | [min] | : | 0.30 | 0.32 | 0.33 | 0.30 | 0.29 | 0.30 |
| ts2 | [min] | : | 0.36 | 0.38 | 0.38 | 0.35 | 0.33 | 0.35 |
| t10 | [min] | : | 0.31 | 0.32 | 0.33 | 0.31 | 0.30 | 0.30 |
| t50 | [min] | : | 0.68 | 0.74 | 0.67 | 0.65 | 0.61 | 0.63 |
| t90 | [min] | : | 2.15 | 2.41 | 2.03 | 2.17 | 2.52 | 2.07 |
| t95 | [min] | : | 2.75 | 3.15 | 2.64 | 2.89 | 3.18 | 2.64 |

Extrusion of Compounds

For the foaming tests, the uncured formulation containing 3 phr of blowing agent (Celogen OT) was mixed on the Roll Mill to form a blanket of the uncured formulation. Uncured EPDM blankets were cut into strips, and then extruded into tapes and rods, using a CW Brabender Intelli-Torque Plasti-Corder, equipped with a single screw extruder with an attached 1" tape die or rod die. The temperature profile was 70° C., 80° C., and 90° C. at the die. The extruder was operated at 50 rpm. It was observed that the tapes made with the inventive compositions had a smooth appearance, with no visible defects.

ment at 230° C., 4 minutes) of the inventive compositions containing EPDM04, and EPDM07 were 1.39 and 1.51, respectively. The expansion ratios for the comparative compositions ranged from 1.29 to 1.57. The inventive compositions show good expansion, with the composition containing EPDM07 having greater expansion than the compositions containing NORDEL 5565 and EPDM01, which have weight average molecular weights less than 200,000 g/mol and tan delta values greater than 1.

TABLE 7

Properties of Rod and Tape Sponge

| Description | | NORDEL 5565 | VISTALON 8600 | VISTALON 8800 | R01 Comp. | R04 Inv. | R07 Inv. |
|---|---|---|---|---|---|---|---|
| Mooney* (ML 1 + 4, 125 C.) | Mu | 42 | 40 | 44 | 44 | 63 | 48 |
| Shore A** | ShA | 27 | 25 | 22 | 27 | 27 | 24 |
| Tensile Modulus** | MPa | .73 | .65 | .66 | .76 | .79 | .74 |
| Strain @ Break** | % | 273 | 364 | 326 | 338 | 308 | 273 |
| Compression Set**, 23° C. | % | 5 | 4 | 6 | 5 | 4 | 6 |
| Compression Set**, 100° C. | % | 30 | 39 | 28 | 39 | 23 | 26 |
| Extruded Rods Foamed in Sandbath (230° C.) | | | | | | | |
| Extrudate Diameter before Foaming | [mm] | 6.7 | 7.0 | 8.5 | 8.2 | 8.3 | 8.3 |
| Expansion Ratio | | 1.25 | 1.41 | 1.35 | 1.20 | 1.33 | 1.37 |
| Spec Gravity (g/cc) | [g/cc] | 0.51 | 0.39 | 0.38 | 0.54 | 0.44 | 0.43 |
| Water Absorption (Vacuum 3 min, 23° C.) | [%] | 26.0 | 8.7 | 7.0 | 10.9 | 0.5 | 0.4 |
| Extruded Tape Foamed in Oven (230° C.) | | | | | | | |
| Extrudate Width Before Foaming [mm] | | 1.40 | 1.45 | 1.86 | 1.63 | 2.0 | 1.73 |
| Expansion Ratio | | 1.29 | 1.63 | 1.57 | 1.38 | 1.39 | 1.51 |
| Spec Gravity (g/cc) | [g/cc] | 0.60 | 0.53 | 0.51 | 0.58 | 0.63 | 0.55 |
| Water Absorption (Vacuum 3 min, 23° C.) | [%] | 5.7 | 3.1 | 4.1 | 2.3 | 0.5 | 1.1 |

*Mooney of cured formulation without blowing agent..
**Mechanical properties of cured formulation without blowing agent.

Foaming

The resulting rods and tapes were cured, at 230° C. for four minutes, in a sand bath (for rods) and hot air oven (for tapes). Due to the thickness of the rods, a sand bath (Techne Fluidized Sandbath, Model #: IFB-51) filled with aluminum oxide powder was used to ensure good heat transfer; the approximately "20 cm long" rods were suspended close to the center of the sand bath. The "20 cm×2.54 cm×1.5 mm thick" tapes were suspended vertically in a hot-air oven. After the thermal treatment, the foamed, crosslinked samples were cooled in a freezer set at −20° C. The foamed, crosslinked samples were conditioned for 24 hours at room temperature, prior to testing.

Table 7 shows the properties of the formulations, and the foamed rods and tapes. The rod expansion ratio (based on the diameters of the non-expanded rod, and expanded rod after thermal treatment at 230° C., 4 minutes) of the inventive compositions containing EPDM 04, and EPDM07 were 1.33 and 1.37, respectively. The expansion ratios of the comparative compositions ranged from 1.20 to 1.41. The inventive compositions show good expansion, and better expansion than the compositions containing NORDEL 5565 and EPDM01, which have weight average molecular weights less than 200,000 g/mol and tan delta values greater than 1.

Figure 3:
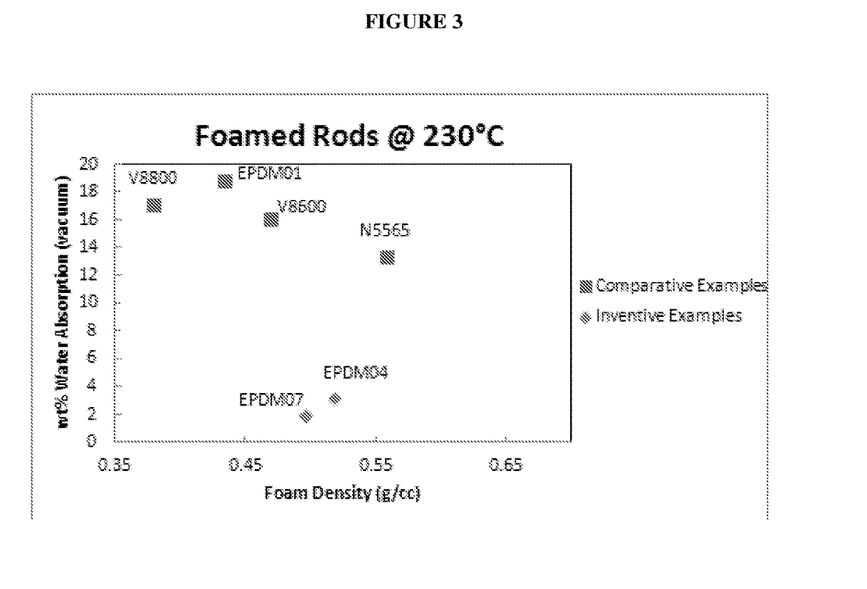
FIG. 3 depicts "Water Absorption (wt %) versus Foam Density" for Foamed Rods at 230° C.

The tape expansion ratio (based on the width of the non-expanded tape, and expanded tape after thermal treat- FIG. 3 shows the water absorption for the foamed rods. The sponge (foamed) formulations, based on the inventive EPDM04 and EPDM07 polymers, resulted in low foam densities (0.4-0.55 g/cc), and exhibited the lowest percent water absorption out of all the samples tested. As seen in FIG. 3, the water absorptions of the foamed rods, made from the inventive compositions containing EPDM04 and EPDM07, are less 4 wt %, and significantly lower than the comparative compositions. The comparative composition containing NORDEL IP 5565 had a water absorption of about 13 wt %, and comparative compositions containing VISTALON 8800 and 8600 had water absorptions of 17 wt % and 16 wt %, respectively. Comparative composition containing EPDM01 had high water absorption of 19 wt %.

Figure 4:
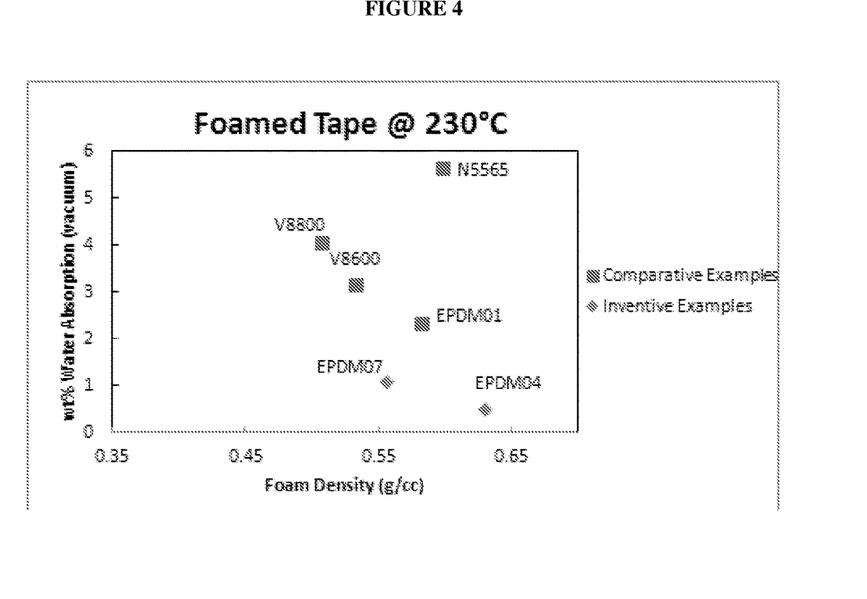
FIG. 4 depicts "Water Absorption (wt %) versus Foam Density" for Foamed Tapes at 230° C.

FIG. 4 shows the water absorption of the foamed tapes. Tapes made from the inventive compositions, containing EPDM04 and EPDM07, are less than 1.5 wt %, and significantly lower than the comparative compositions. The comparative composition containing NORDEL IP 5565 had the highest water absorption of 5.7 wt %, and the comparative compositions containing VISTALON 8600 and 8800 exhibiting 3.1 wt % and 4.1 wt %, respectively. The comparative composition containing EPDM01 had a higher water absorption of 2.3 wt %.

It has been unexpectedly discovered that the inventive compositions produce low density foams that have low water absorption. This unprecedented combination of low water absorption and low density indicates that the majority of the cells formed, in the inventive compositions, have a closed-cell structure. The benefit to foams having high closed cell content include low water absorption, less shrinkage upon cooling, and increased dimensional stability. For foams used for outdoor applications (for example, a door seal), a decrease in moisture absorption will improve sealing performance.

It has been discovered that the inventive compositions provide an unexpected combination of low water absorption and low foam density. An inventive composition provides for a homogeneous dispersion of the high molecular weight and highly branched ethylene/alpha-olefin/nonconjugated polyene interpolymer with other additives. It is believed that the high levels of % mm tacticity, leads to improved compatibility with the additional components in the foam recipe (for example, oil, curatives, accelerators, other polymers). When foamed, an article with a smooth surface skin, a cellular morphology with low open cell content results. The foamed article has good compression set, low specific gravity, and very low water absorption.

The invention claimed is:

1. A composition comprising a first composition that comprises an EPDM, and wherein this EPDM has the following properties:
   A) a Mw greater than, or equal to, 200,000 g/mole; and
   B) a peak area from 21.3 ppm to 21.8 ppm that is greater than, or equal to, 10 percent of the total integral area from 19.5 ppm to 22.0 ppm, as determined by 13C NMR; and
   wherein the first composition has a tan delta (190° C. at 0.1 rad/sec) less than, or equal to, 1.0; and
   wherein the EPDM has a MWD less than, or equal to, 4.0; and
   wherein the EPDM has a rheology ratio (V0.1/V100 at 190° C.) greater than, or equal to, 40.

2. The composition of claim 1, wherein the first composition further comprises an oil.

3. The composition of claim 1, wherein the interpolymer has a rheology ratio from 80 to 130.

4. The composition of claim 1, wherein the first composition has a viscosity at 0.1 rad/sec, 190° C., from 150,000 to 250,000 Pa·s.

5. The composition of claim 1, wherein the interpolymer has a polyene content from 6 to 15 weight percent, based on the weight of the interpolymer.

6. The composition of claim 1, wherein the interpolymer has a Mooney Viscosity greater than, or equal to, 60 (ML 1+4, 125° C.).

7. The composition of claim 1, wherein the interpolymer comprises from 40 to 65 weight percent ethylene, based on the weight of the interpolymer.

8. An article comprising at least one component formed from the composition of claim 1.

9. The article of claim 8, wherein the article is a foam.

10. The article of claim 8, wherein the article is selected from the group consisting of profiles, injection molded parts, gaskets, automotive parts, building and construction materials, shoe components and tubes.

11. A process for preparing the composition of claim 1, said process comprising polymerizing, in solution, at least the following: ethylene, an alpha-olefin and a nonconjugated polyene.

12. The composition of claim 4, wherein the EPDM comprises from 45 to 58 weight percent ethylene, based on the weight of the interpolymer.

13. The composition of claim 1, wherein the diene of the EPDM is ENB.

14. The composition of claim 1, wherein the EPDM has a Mw from 200,000 to 300,000 g/mol.

* * * * *